United States Patent
Sun et al.

(10) Patent No.: US 10,359,080 B2
(45) Date of Patent: Jul. 23, 2019

(54) FAN, MOTOR DRIVING ASSEMBLY AND LOAD CONNECTING MECHANISM THEREOF

(71) Applicant: Johnson Electric S.A., Murten (CH)

(72) Inventors: Chi Ping Sun, Hong Kong (CN); Bao Ting Liu, Shenzhen (CN); Jing Ning Ta, Hong Kong (CN); Chui You Zhou, Shenzhen (CN); Fei Xin, Shenzhen (CN); Shing Hin Yeung, Hong Kong (CN); Xiu Wen Yang, Shenzhen (CN); Shu Juan Huang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 202 days.

(21) Appl. No.: 15/676,443

(22) Filed: Aug. 14, 2017

(65) Prior Publication Data

US 2018/0045253 A1 Feb. 15, 2018

(30) Foreign Application Priority Data

Aug. 15, 2016 (CN) .......................... 2016 1 0674599

(51) Int. Cl.
*F16D 13/26* (2006.01)
*F16D 13/40* (2006.01)
(Continued)

(52) U.S. Cl.
CPC ........... *F16D 13/40* (2013.01); *F04D 19/002* (2013.01); *F04D 25/022* (2013.01); *F04D 25/06* (2013.01); *F04D 25/08* (2013.01); *F04D 29/263* (2013.01); *F04D 29/325* (2013.01); *F04D 29/646* (2013.01); *F04D 29/668* (2013.01); *F16D 7/025* (2013.01); *F16D 7/028* (2013.01);
(Continued)

(58) Field of Classification Search
None
See application file for complete search history.

(56) References Cited

U.S. PATENT DOCUMENTS 3,833,923 A * 9/1974 Camras .............. G11B 15/1891
360/261.2
4,141,044 A * 2/1979 Kistner .................. G06K 7/015
235/475
(Continued)

*Primary Examiner* — Michael Lebentritt
(74) *Attorney, Agent, or Firm* — Muncy, Geissler, Olds & Lowe, P.C.

(57) ABSTRACT

A load connecting mechanism includes a mounting portion, a contact portion, and a force-exerting portion. The mounting portion is configured to mount the load connecting mechanism to a power source and a load, respectively. The contact portion is disposed on the mounting portion and includes two slidably coupled contact faces. The force-exerting portion is configured to provide a force to the contact faces in an axial direction of the power source to make the contact faces closely slidably couple to each other. Through the slidable coupling relationship between the contact faces, power of the power source is progressively transmitted to the load and finally drives the load to rotate in synchronization with the power source. The present invention further provides a motor driving assembly and a fan. The mechanism can satisfy the needs of bidirectional rotation of a load such as a fan and of large startup torque.

20 Claims, 6 Drawing Sheets

(51) Int. Cl.
  *F04D 25/06* (2006.01)
  *F04D 25/08* (2006.01)
  *F04D 29/26* (2006.01)
  *F04D 29/32* (2006.01)
  *F04D 29/64* (2006.01)
  *F16D 13/64* (2006.01)
  *F16D 13/66* (2006.01)
  *H02K 7/14* (2006.01)
  *F04D 19/00* (2006.01)
  *F04D 25/02* (2006.01)
  *F16D 7/02* (2006.01)
  *F04D 29/66* (2006.01)

(52) U.S. Cl.
  CPC ............. *F16D 13/26* (2013.01); *F16D 13/64* (2013.01); *F16D 13/66* (2013.01); *H02K 7/14* (2013.01)

(56) References Cited

U.S. PATENT DOCUMENTS

| | | | | |
|---|---|---|---|---|
| 4,199,305 A * | 4/1980 | Pareja | ................... | F04C 14/26 |
| | | | | 417/440 |
| 5,794,909 A * | 8/1998 | Platus | ................... | F16F 15/02 |
| | | | | 248/550 |
| 6,695,294 B2 * | 2/2004 | Miller | ................... | B60G 15/08 |
| | | | | 188/322.18 |
| 7,824,290 B1 * | 11/2010 | Brookins | ................ | B60K 6/12 |
| | | | | 475/107 |
| 2005/0175449 A1 * | 8/2005 | Yonehara | ................ | F04D 15/00 |
| | | | | 415/206 |
| 2008/0265515 A1 * | 10/2008 | Grunwald | ........... | F16J 15/3484 |
| | | | | 277/308 |
| 2017/0063195 A1 * | 3/2017 | Li | ........................ | H02K 7/112 |

\* cited by examiner

FAN, MOTOR DRIVING ASSEMBLY AND LOAD CONNECTING MECHANISM THEREOF

CROSS REFERENCE TO RELATED APPLICATIONS

This non-provisional patent application claims priority under 35 U.S.C. § 119(a) from Patent Application No. 201610674599.6 filed in The People's Republic of China on Aug. 15, 2016.

FIELD OF THE INVENTION

This invention relates to the field of motors, and in particular to a motor driving assembly, its load connecting mechanism and a fan employing the motor driving assembly.

BACKGROUND OF THE INVENTION

Referring to FIG. 1, a conventional motor driving assembly is shown, which drives a fan to rotate. The motor driving assembly includes a driving shaft 71 and a fixing base 73 fixed on the driving shaft 71 at a motor 50 side, and a connecting base 75 fixedly connected to a fan impeller at a fan 60 side. The motor driving assembly further includes a torsional spring 79 connecting the fixing base 73 and the connecting base 75. The connecting base 75 is attached around the driving shaft 71, and the torsional spring 79 is attached around the connecting base 75. Upon startup of the motor 50, the torsional spring 79 is tightened around the connecting base 75, such that the connecting base 75 and the driving shaft 71 generate therebetween a sufficient large frictional force which drives the fan impeller to rotate. In the above motor driving assembly, since the torsional spring 79 is used to provide a radial force to the connecting base 75, the impeller can be driven to rotate only in a single direction. Therefore, the conventional motor driving assembly cannot meet the bidirectional rotation need that may be possibly desired during fabrication, assembly and use of the fan.

SUMMARY OF THE INVENTION

Accordingly, the present invention provides a load connecting mechanism including a mounting portion, a contact portion, and a force-exerting portion. The mounting portion is configured to mount the load connecting mechanism to a power source and a load, respectively. The contact portion is disposed on the mounting portion and includes two slidably coupled contact faces. The force-exerting portion is configured to provide a force to the contact faces in an axial direction of the power source to make the contact faces closely slidably contact each other. Through the slidable coupling relationship between the contact faces, power of the power source is progressively transmitted to the load and finally drives the load to rotate in synchronization with the power source.

Preferably, the mounting portion comprises a power source mounting portion and a load mounting portion. The contact portion comprises a first contact portion disposed on the power source mounting portion and a second contact portion disposed on the load mounting portion. The two slidably coupled contact faces are respectively disposed on opposite surfaces of the first contact portion and the second contact portion and contact each other, and the power of the power source is transmitted to the load through a frictional force between the contact faces.

Preferably, the power source mounting portion is connected to and rotates along with an output shaft of the power source, and the load mounting portion is connected to and rotates along with the load.

Preferably, the force-exerting portion comprises an elastic member. The elastic member is configured to be tensioned or compressed to provide a pressing force to the first contact portion in an axial direction of the power source toward the second contact portion, and/or provide a pressing force to the second contact portion in the axial direction of the power source toward the first contact portion.

Preferably, the elastic member is a rubber member, a compression spring or an extension spring.

Preferably, the power source mounting portion is a tubular structure having an opening at one end and a bottom at an opposite end. The power source mounting portion is attached around an output shaft of the power source and is circumferentially fixed relative to the output shaft. The load mounting portion is a tubular structure having an opening at one end and a bottom at an opposite end. The power source mounting portion is received within the load mounting portion. An endcap is provided at the opening of the load mounting portion. The output shaft of the power source passes through one end of the load mounting portion and the opening of the power source mounting portion into an interior of the power source mounting portion. The elastic member is compressed, with one end of the elastic member abutting against the power source mounting portion, and the other end of the elastic member abutting against an inner side of said one end of the load mounting portion.

Preferably, the opening of the load mounting portion and the opening of the power source mounting portion face in the same direction. The endcap defines a hole allowing the output shaft of the power source to pass therethrough, and one end of the elastic member abuts against the endcap.

Preferably, the endcap has threads, an inner surface of the load mounting portion at the opening thereof has threads engaged with the threads of the endcap, and the endcap is threaded into the opening of the load mounting portion.

Preferably, the endcap is adjustably threaded into the opening of the load mounting portion. The force exerted by the elastic member to the first contact portion in the axial direction of the power source toward the second contact portion and/or the force exerted by the elastic member to the second contact portion in the axial direction of the power source toward the first contact portion are adjustable by controlling a position of the endcap threaded into the opening of the load mounting portion.

Preferably, the first contact portion is the bottom of the power source mounting portion or disposed at one side of the bottom of the power source mounting portion toward the bottom of the load mounting portion, and one side of the first contact portion toward the bottom of the load mounting portion is one of the contact faces.

Preferably, the second contact portion is the bottom of the load mounting portion or disposed at one side of the bottom of the load mounting portion toward the power source mounting portion, and one side of the second contact portion toward the power source mounting portion is the other of the contact faces.

Preferably, the force-exerting portion comprises at least two pressing blocks. A first pressing block of the at least two pressing blocks provides a pressing force to the first contact portion in the axial direction of the power source toward the second contact portion, and/or a second pressing block of the at least two pressing blocks provides a pressing force to the second contact portion in the axial direction of the power source toward the first contact portion.

Preferably, the two pressing blocks are disposed on the output shaft of the power source, and the first contact portion and the second contact portion are disposed between and compressed by the two pressing blocks.

Preferably, an axial position of at least one of the pressing blocks on the output shaft of the power source is adjustable. The force exerted by the first pressing block to the first contact portion in the axial direction of the power source toward the second contact portion and/or the force exerted by the second pressing block to the second contact portion in the axial direction of the power source toward the first contact portion are adjustable by adjusting the axial position of the at least one of the pressing blocks on the output shaft of the power source.

Preferably, at least one of the contact faces is provided with grainy protrusions.

Preferably, at least one of the contact faces is made from a rubber material.

Preferably, one of the contact faces is a truncated-cone-shaped face, and the other contact face is an inner surface of a truncated-cone-shaped recess.

Preferably, one of the contact faces is serrated.

Preferably, one of the contact portions is in the shape of a spring tab made from a metal material, and the contact face of the contact portion is a curved surface.

The present invention further provides a motor driving assembly. The motor driving assembly comprises a motor as a power source and the load connecting mechanism as described above.

The present invention further provides a fan. The fan comprises a motor as a power source, a fan impeller as a load, and the load connecting mechanism as described above.

Implementation of the present invention can satisfy the bidirectional rotation needs of a load such as a fan, and is particularly suitable for a load having a large inertia moment and requiring bidirectional rotation.

BRIEF DESCRIPTION OF THE DRAWINGS

The present invention is described below in greater detail with reference to the drawings and embodiments.

DETAILED DESCRIPTION OF THE PREFERRED EMBODIMENTS

Figure 1:
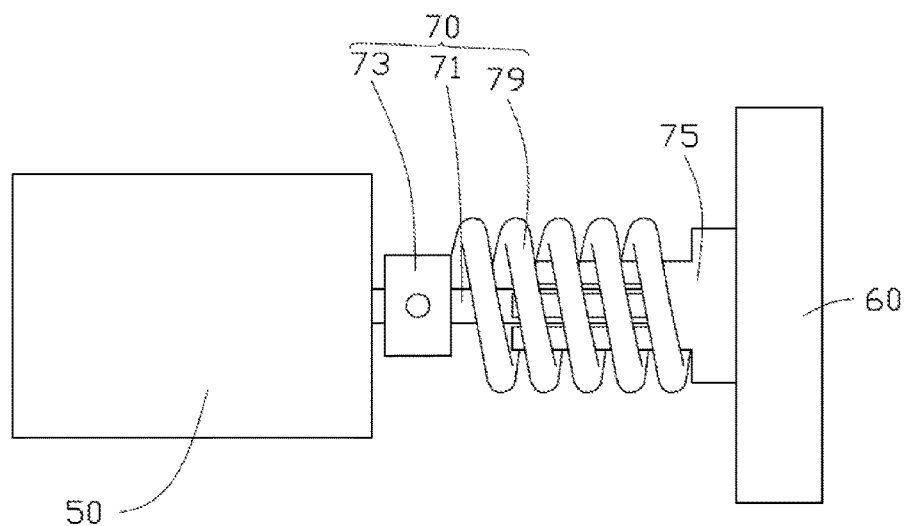
FIG. 1 illustrates a conventional motor driving assembly.

Below, embodiments of the present invention will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art. The phrase "and/or" used in this disclosure means that each and every combination of one or more associated items listed thereafter are included.

It is noted that, when a component is described to be "fixed" or "mounted" to another component, it can be directly fixed or mounted to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component.

Figure 2:
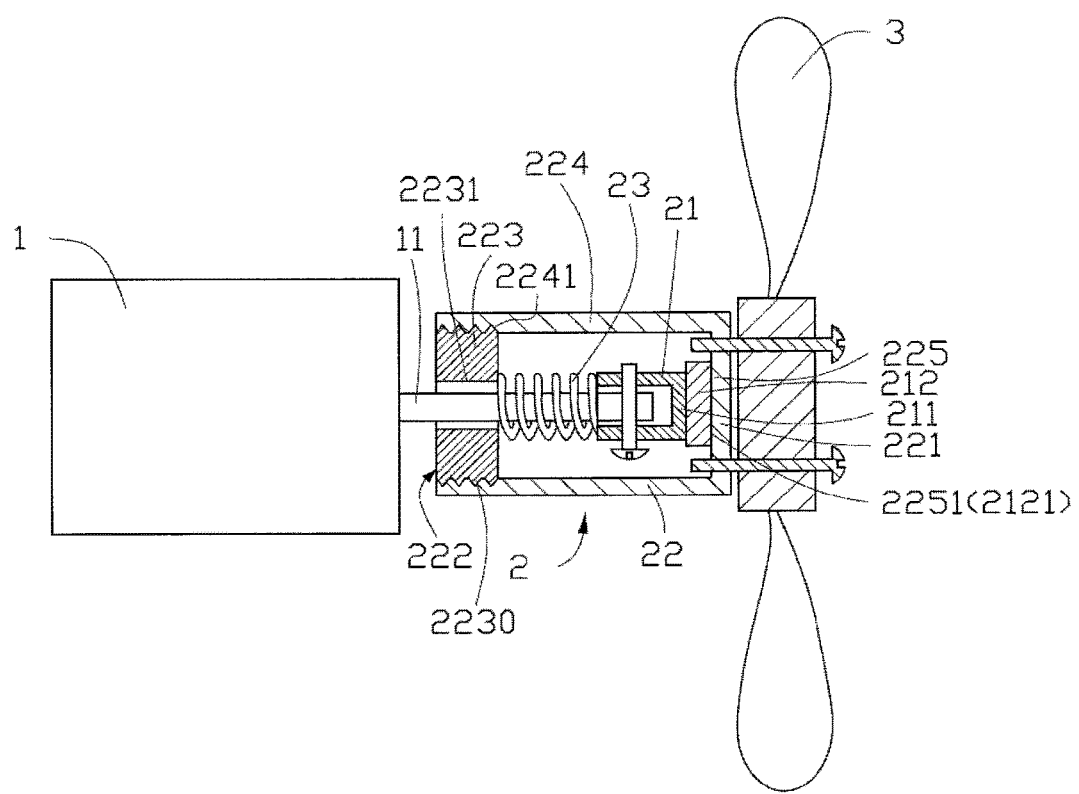
FIG. 2 illustrates a motor driving assembly according to a first embodiment of the present invention.

FIG. 2 illustrates a motor driving assembly according to a first embodiment of the present invention. The motor driving assembly includes a motor 1 as a power source and a load connecting mechanism 2. The load connecting mechanism 2 is connected to a load such as a fan impeller 3, to drive the fan impeller 3 to rotate along with the motor 1 after startup of the motor 1. In this embodiment, the motor 1 is a self-starting permanent magnet alternating current motor.

The load connecting mechanism 2 includes a mounting portion. The mounting portion includes a power source mounting portion and a load mounting portion 22. In this embodiment, the power source mounting portion is a motor mounting portion 21. The motor mounting portion 21 is used to connect or mount the load connecting mechanism 2 to an output shaft 11 of the power source such as the motor 1 such that the load connecting mechanism 2 rotates along with the motor 1. In at least one embodiment, the motor mounting portion 21 is rigidly connected to the motor 1. The load mounting portion 22 is used to connect or mount the load connecting mechanism 2 to the load such as the fan impeller 3, to drive the load. In at least one embodiment, the load mounting portion 22 is rigidly connected to the load.

In the embodiment of FIG. 1, the motor mounting portion 21 is a tubular structure that has a bottom 211 at one end. The tubular structure is attached around a distal end of the output shaft 11 of the motor 1. The motor mounting portion 21 and the output shaft 11 of the motor 1 are circumferentially fixed relative to each other through a connecting member such as a thread connecting member. In another embodiment, the motor mounting portion 21 and the output shaft 11 of the motor 1 are axially fixed relative to each other through the same or another connecting member. Alternatively, a mechanism is provided to permit the motor mounting portion 21 to move within a predetermined range relative to the output shaft 11 in an axial direction of the motor 1. The motor mounting portion 21 includes a contact portion 212 toward the load mounting portion 22. The contact portion 212 may be the bottom 211 of the motor mounting portion 21, or alternatively another part disposed at one side of the bottom 211 toward the load mounting portion 22. The contact portion 212 has a contact face 2121 toward the load mounting portion 22.

The load mounting portion 22 includes a barrel portion 224. The barrel portion 224 is a tubular structure that has a bottom 221 at one end and has an opening 222 toward the motor 1. An endcap 223 is disposed at the opening 222. The endcap 223 is fixed to the barrel portion 224 through a connecting structure. In one embodiment, the endcap 223 has external threads 2230, an inner surface of the barrel portion 224 at the opening 222 end is provided with a threaded portion 2241 that meshes with the external threads 2230 of the endcap 223, and the endcap 223 and the barrel portion 224 are fixed to each other by threading to each other. The endcap 223 defines a hole 2231 allowing the output shaft 11 of the motor 1 to pass therethrough, and the motor mounting portion 21 is located within an interior space of the load mounting portion 22. If the motor mounting portion 21 is not fully axially fixed to the output shaft 11, the endcap 223 may be designed to be fixed relative to the output shaft 11 in the axial direction thereof. That is, neither of the motor mounting portion 21 and the load mounting portion 22 needs to be fixed in the axial direction of the output shaft 11 of the motor 1, or alternatively, one of the motor mounting portion 21 and the load mounting portion 22 may be axially fixed to the output shaft 11. The bottom 221 is fixed to a hub of the fan impeller 3 through a connecting member such as a thread connecting member. In another embodiment, the load mounting portion 22 may be fixed to the hub of the fan impeller 3 in another manner such as by integrally forming or insert molding. The motor mounting portion 22 includes a contact portion 225 toward the motor connecting portion 21. The contact portion 225 may be the bottom 221 of the load mounting portion 22, or alternatively another part disposed at one side of the bottom 221 toward the motor mounting portion 21. The contact portion 225 has a contact face 2251 toward the motor mounting portion 21. The contact face 2251 and the contact face 2121 of the motor mounting portion 21 are coupled to transmit power.

The load connecting mechanism 2 further includes a force-exerting portion 23. The force-exerting portion 23 directly or indirectly exerts a force on the contact portion 212 and/or the contact portion 225 to result in closer coupling between the contact portions 212, 225 for more effective power transmission. In various embodiments of the present invention, the force-exerting portion 23 exerts a force along the axial direction of the motor 1 to the contact portion 212 and/or the contact portion 225, which makes the contact portion 212 and the contact portion 225 more closely contact each other. In one embodiment, the force-exerting portion 23 is an elastic member such as a spring. The spring has one end connected to the motor mounting portion 21, and the other end connected to the load mounting portion 22. The spring is compressed or tensioned to generate a force making the contact portions 212, 225 more closely contact each other. As shown in FIG. 2, the spring is attached around the output shaft 11 of the motor 1 and is compressed, with one end abutting against the motor mounting portion 21 and the other end abutting against the endcap 223 of the load mounting portion 22. If the motor mounting portion 21 is movable in the axial direction of the motor 1, the spring exerts an axial force to the motor mounting portion 21 toward the bottom 221 of the load mounting portion 22. This force is conducted to the contact face 2121 of the motor mounting portion 21, which makes the contact face 2121 closely contact the contact face 2251 of the load mounting portion 22. On the other hand, the spring exerts an axial force to the endcap 223 in a direction away from the contact face 2121 of the motor mounting portion 21. This force is conducted to the contact face 2251 of the load mounting portion 22 through the barrel portion 224, which makes the contact force 2251 slidably closely contact the contact face 2121 of the motor mounting portion 21. In the embodiment of FIG. 2, the spring may also be replaced with a rubber member.

During fabrication, assembly or subsequent use of the motor driving assembly, by controlling the position of the endcap 223 of the load mounting portion 22 threaded into the barrel portion 224, the force exerted by the force-exerting portion 23 to the contact portions 212, 225 can be adjusted so as to adjust the frictional force and the degree of coupling between the contact face 2121 and the contact face 2251 to accommodate different startup torque needed by the load. In addition, for a load having a large inertia moment, by adjusting the position of the endcap 223 threaded into the barrel portion 224, brief sliding between the contact faces 2121, 2251 can be allowed at the beginning of startup of the motor 1, such that rotational power of the motor 1 is progressively transmitted to the load. After the load is successfully started, the difference of angular momentum between the output shaft 11 of the motor 1 and the load decreases, and the sliding between the contact faces 2121, 2251 progressively decreases until the rotation speed of the load progressively increases and finally becomes synchronous with the motor 1, at which time the contact faces 2121, 2251 do not slide relative to each other. As such, with the provision of the adjustment structure (the inter-engaged thread structures), the frictional force and the degree of coupling between the contact faces 2121 and 2251 are adjustable, which not only satisfies the bidirectional rotation of the load, but it also avoids startup failure of the load with large inertia moment.

In another embodiment, the positions of the bottom 221 and the opening 222 may be exchanged, the opening 222 and endcap 223 of the load mounting portion 22 may be disposed adjacent to the load, and the load may be fixed to the endcap 223. The contact portion 225 may be the endcap 223, or another part disposed at one side of the endcap 223 toward the motor mounting portion 21.

Figure 3:
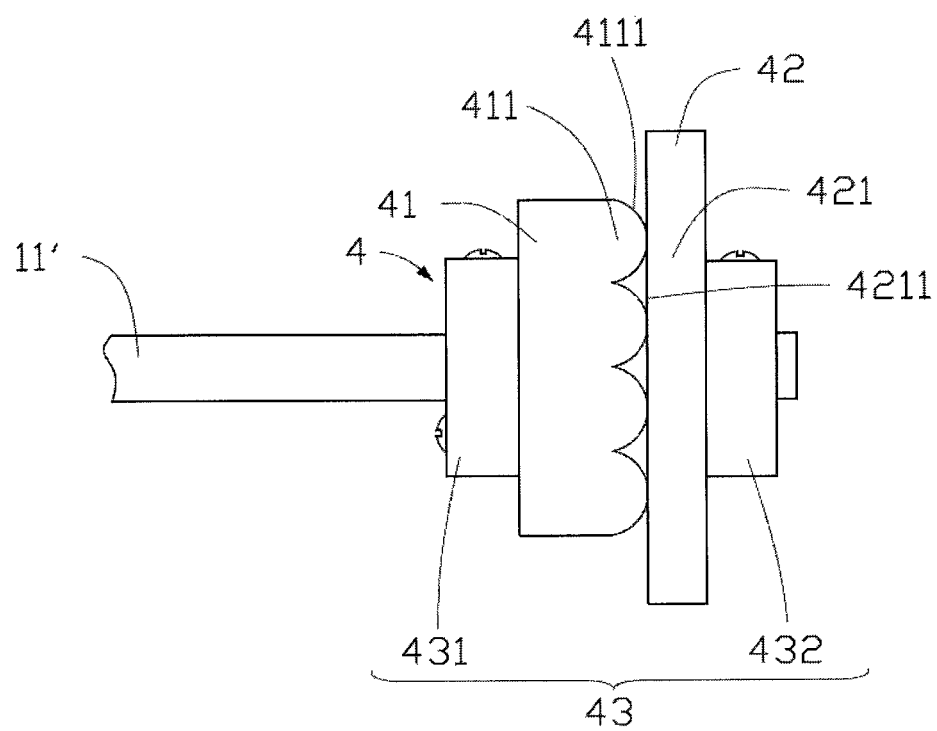
FIG. 3 illustrates a motor driving assembly according to a second embodiment of the present invention.

FIG. 3 illustrates a motor driving assembly according to a second embodiment of the present invention. The motor driving assembly includes a load connecting mechanism 4. Similar to the first embodiment, the load connecting mechanism 4 includes a motor mounting portion 41, a load mounting portion 42, and a force-exerting portion 43. The motor mounting portion 41 is mounted to an output shaft 11' of the motor and is circumferentially fixed relative to the output shaft 11' so as to rotate along with the output shaft 11'. The load mounting portion 42 is mounted on a load such as a hub of the fan to drive the load to move. In this embodiment, the load mounting portion 42 is also attached around the output shaft 11' of the motor.

The motor mounting portion 41 includes a contact portion 411; in other words, the contact portion 411 is disposed on the motor mounting portion 41. The contact portion 411 includes a contact face 4111 toward the load mounting portion 42. The load mounting portion 42 includes a contact portion 421; in other words, the contact portion 421 is disposed on the load mounting portion 42. The contact portion 421 includes a contact face 4211 toward the contact portion 411 of the motor mounting portion 41. The two contact faces 4111, 4211 contact each other to transmit the motor power to the fan.

The force-exerting portion 43 exerts a force on the contact portion 411 and/or the contact portion 421 to result in closer coupling between the contact faces 4111, 4211 of the two contact portions 411, 421 for more effective power transmission. The force-exerting portion 43 includes two pressing blocks 431, 432 mounted on the output shaft 11' of the motor. The pressing block 431 is mounted on one side of the motor mounting portion 41 away from the load mounting portion 42, and the pressing block 432 is mounted on one side of the load mounting portion 42 away from the motor mounting portion 41. The two pressing blocks 431, 432 are fixed both circumferentially and axially relative to the output shaft 11' to sandwich the two contact portions 411, 421 between the pressing blocks 431, 432, such that the two contact portions 411, 421 can be slidably closely coupled for effective power transmission.

During fabrication, assembly or even subsequent use of the motor driving assembly, a distance between the two pressing blocks 431, 432 can be adjusted by moving the pressing block 431 and/or the pressing block 432 in the axial direction of the output shaft 11'. After the distance between the two pressing blocks 431, 432 has been adjusted as desired, the two pressing blocks 431, 432 are fixed to adjust the force exerted by the force-exerting portion 43 to the contact portions 411, 421. Thereby, the frictional force and the degree of coupling between the contact face 4111 and the contact face 4211 are adjusted to accommodate different startup torque needed by the load. In addition, for a load having a large inertia moment, by adjusting the distance between the two pressing blocks 431, 432, brief sliding between the contact faces 4111, 4211 can be allowed at the beginning of startup of the motor, such that rotational power of the motor is progressively transmitted to the load. After the load is successfully started, the difference of angular momentum between the output shaft 11 of the motor 1 and the load decreases, and the sliding between the contact faces 4111, 4211 progressively decreases until the rotation speed of the load progressively increases and finally becomes synchronous with the motor, at which time the contact faces 4111, 4211 do not slide relative to each other. As such, with the provision of the adjustment structure (the mounting structure used to removably mount the force-exerting portion 43 to the output shaft 11' in this embodiment), the frictional force and the degree of coupling between the contact faces 4111 and 42111 are adjustable, which not only satisfies the bidirectional rotation of the load, but it also avoids startup failure of the load with large inertia moment.

In this embodiment, after the distance between the two pressing blocks 431, 432 has been adjusted as desired, the two pressing blocks 431, 432 are rigidly connected to the output shaft 11' of the motor.

Figure 4:
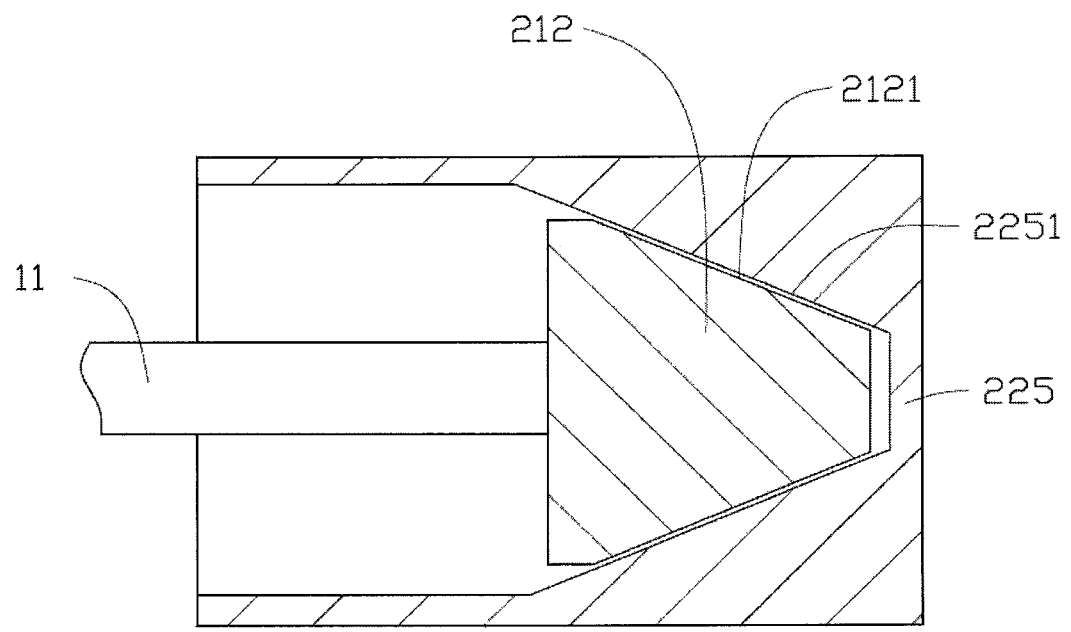
FIG. 4 illustrates contact faces of the motor driving assembly according to one embodiment of the present invention.
Figure 5:
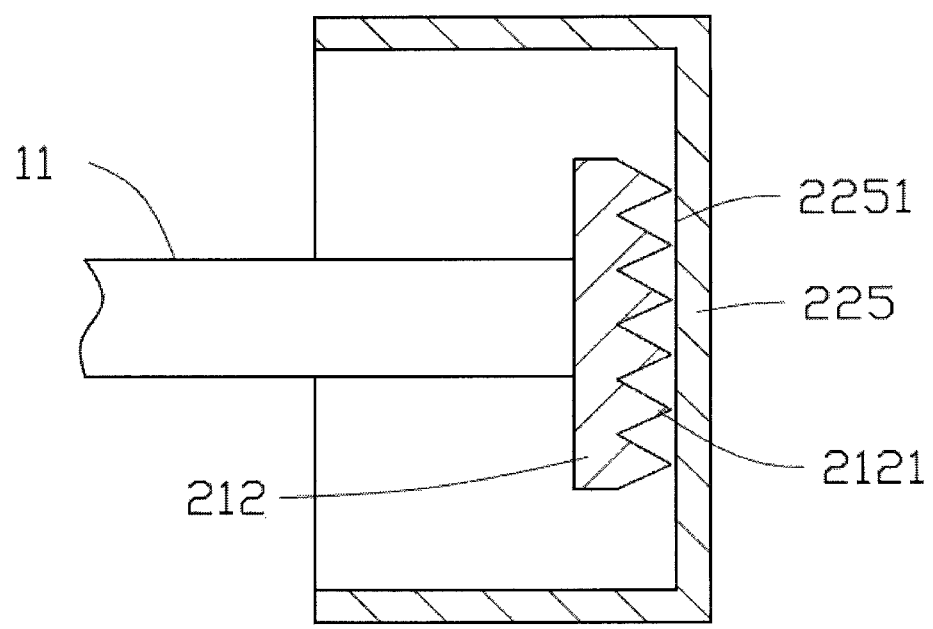
FIG. 5 illustrates contact faces of the motor driving assembly according to another embodiment of the present invention.
Figure 6:
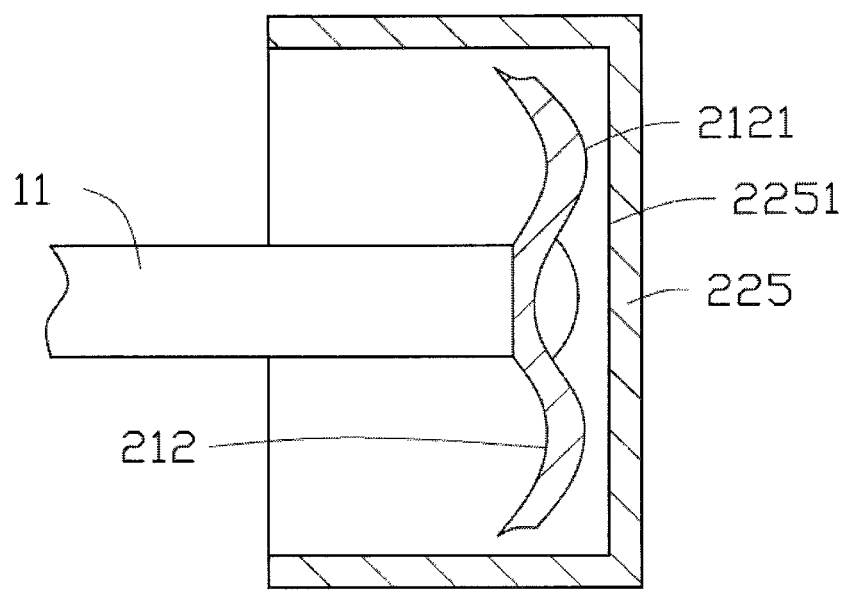
FIG. 6 illustrates contact faces of the motor driving assembly according to still another embodiment of the present invention.

In summary, embodiments of the present invention provide a motor driving assembly and its load connecting mechanism. The load connecting mechanism includes a mounting portion, a contact portion, and a force-exerting portion. The mounting portion is used to mount the load connecting mechanism to a power source and a load. The contact portion includes a pair of slidably coupled contact faces, and power of the power source such as a motor is transmitted to the load by a frictional force between the contact faces. The force-exerting portion is used to provide an appropriate force to the contact faces in an axial direction of the motor to result in a coupling relationship between the contact faces for more effective power transmission. In addition, coefficient of friction of the contact faces can be changed by modifying material, shape and surface roughness of the contact faces. For example, the contact faces may be made from a rubber material, and rough grainy protrusions can be disposed on the contact faces. In addition to the flat and serrated contact faces illustrated in FIG. 2 and FIG. 3, the contact faces may be of other shapes. For example, in the embodiments of FIG. 2 and FIG. 3, a truncated-cone-shaped contact face and a truncated-cone-shaped recessed contact face shown in FIG. 4 may be used, or a serrated contact face shown in FIG. 5 may be used. Alternatively, one contact face may be formed by a curved contact surface of a spring tab made of metal such as steel shown in FIG. 6. By adjusting the force exerted by the force-exerting portion to the contact portions, the frictional force generated between the contact faces of different materials and shapes may vary to different extent, thereby accommodating different adjustment needs.

In the motor driving assembly and its load connecting mechanism of embodiments of the present disclosure, no torsional spring is used, and the load is driven to rotate by the frictional force between the contact faces. Therefore, the load not only can rotate in a single direction, but it also can achieve bidirectional rotation when required. In addition, the load connecting mechanism has a simple structure and low cost. Furthermore, with the force exerted by the force-exerting portion being adjustable by the adjustment structure, the present invention can accommodate different startup torque needed by the load.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A load connecting mechanism comprising:
    a mounting portion configured to mount the load connecting mechanism to a power source and a load, respectively;
    a contact portion disposed on the mounting portion and comprising two slidably coupled contact faces; and
    a force-exerting portion configured to provide a force to the contact faces in an axial direction of the power source to make the contact faces closely slidably contact each other, wherein, through the slidable coupling relationship between the contact faces, power of the power source is progressively transmitted to the load and finally drives the load to rotate in synchronization with the power source.

2. The load connecting mechanism of claim 1, wherein the mounting portion comprises a power source mounting portion and a load mounting portion, the contact portion comprises a first contact portion disposed on the power source mounting portion and a second contact portion disposed on the load mounting portion, the two slidably coupled contact faces are respectively disposed on opposite surfaces of the first contact portion and the second contact portion and contact each other, and the power of the power source is transmitted to the load through a frictional force between the contact faces.

3. The load connecting mechanism of claim 2, wherein the power source mounting portion is configured to connect to and rotate along with an output shaft of the power source, and the load mounting portion is configured to connect to and rotate along with the load.

4. The load connecting mechanism of claim 3, wherein the force-exerting portion comprises an elastic member, the elastic member is configured to be tensioned or compressed to provide a pressing force to the first contact portion in an axial direction of the power source toward the second contact portion, and/or provide a pressing force to the second contact portion in the axial direction of the power source toward the first contact portion.

5. The load connecting mechanism of claim 4, wherein the elastic member is a rubber member, a compression spring or an extension spring.

6. The load connecting mechanism of claim 4, wherein the power source mounting portion is a tubular structure having an opening at one end and a bottom at an opposite end, the power source mounting portion is attached around an output shaft of the power source and is circumferentially fixed relative to the output shaft, the load mounting portion is a tubular structure having an opening at one end and a bottom at an opposite end, the power source mounting portion is received within the load mounting portion, an endcap is provided at the opening of the load mounting portion, the output shaft of the power source passing through one end of the load mounting portion and the opening of the power source mounting portion into an interior of the power source mounting portion, and the elastic member is compressed, with one end of the elastic member abutting against the power source mounting portion, and the other end of the elastic member abutting against an inner side of said one end of the load mounting portion.

7. The load connecting mechanism of claim 6, wherein the opening of the load mounting portion and the opening of the power source mounting portion face in the same direction, the endcap defines a hole allowing the output shaft of the power source to pass therethrough, and one end of the elastic member abuts against the endcap.

8. The load connecting mechanism of claim 7, wherein the endcap has threads, an inner surface of the load mounting portion at the opening thereof has threads engaged with the threads of the endcap, and the endcap is threaded into the opening of the load mounting portion.

9. The load connecting mechanism of claim 8, wherein the endcap is adjustably threaded into the opening of the load mounting portion, and the force exerted by the elastic member to the first contact portion in the axial direction of the power source toward the second contact portion and/or the force exerted by the elastic member to the second contact portion in the axial direction of the power source toward the first contact portion are adjustable by controlling a position of the endcap threaded into the opening of the load mounting portion.

10. The load connecting mechanism of claim 7, wherein the first contact portion is the bottom of the power source mounting portion or disposed at one side of the bottom of the power source mounting portion toward the bottom of the load mounting portion, and one side of the first contact portion toward the bottom of the load mounting portion is one of the contact faces.

11. The load connecting mechanism of claim 10, wherein the second contact portion is the bottom of the load mounting portion or disposed at one side of the bottom of the load mounting portion toward the power source mounting portion, and one side of the second contact portion toward the power source mounting portion is the other of the contact faces.

12. The load connecting mechanism of claim 3, wherein the force-exerting portion comprises at least two pressing blocks, a first pressing block of the at least two pressing blocks provides a pressing force to the first contact portion in the axial direction of the power source toward the second contact portion, and/or a second pressing block of the at least two pressing blocks provides a pressing force to the second contact portion in the axial direction of the power source toward the first contact portion.

13. The load connecting mechanism of claim 12, wherein the two pressing blocks are disposed on the output shaft of the power source, and the first contact portion and the second contact portion are disposed between and compressed by the two pressing blocks.

14. The load connecting mechanism of claim 13, wherein an axial position of at least one of the pressing blocks on the output shaft of the power source is adjustable, and the force exerted by the first pressing block to the first contact portion in the axial direction of the power source toward the second contact portion and/or the force exerted by the second pressing block to the second contact portion in the axial direction of the power source toward the first contact portion are adjustable by adjusting the axial position of the at least one of the pressing blocks on the output shaft of the power source.

15. The load connecting mechanism of claim 2, wherein at least one of the contact faces is serrated or provided with grainy protrusions.

16. The load connecting mechanism of claim 2, wherein at least one of the contact faces is made from a rubber material.

17. The load connecting mechanism of claim 2, wherein one of the contact faces is a truncated-cone-shaped face, and the other contact face is an inner surface of a truncated-cone-shaped recess.

18. The load connecting mechanism of claim 2, wherein one of the contact portions is in the shape of a spring tab made from a metal material, and the contact face of the contact portion is a curved surface.

19. A motor driving assembly comprising:
a motor as a power source; and
a load connecting mechanism comprising:
    a mounting portion configured to mount the load connecting mechanism to the power source and a load, respectively;
    a contact portion disposed on the mounting portion and comprising two slidably coupled contact faces; and
    a force-exerting portion configured to provide a force to the contact faces in an axial direction of the power source to make the contact faces closely slidably contact each other, wherein, through the slidable coupling relationship between the contact faces, power of the power source is progressively transmitted to the load and finally drives the load to rotate in synchronization with the power source.

20. A fan comprising:
a motor as a power source;
a fan impeller as a load; and
a load connecting mechanism comprising:
    a mounting portion configured to mount the load connecting mechanism to the power source and the load, respectively;
    a contact portion disposed on the mounting portion and comprising two slidably coupled contact faces; and
    a force-exerting portion configured to provide a force to the contact faces in an axial direction of the power source to make the contact faces closely slidably contact each other, wherein, through the slidable coupling relationship between the contact faces, power of the power source is progressively transmitted to the load and finally drives the load to rotate in synchronization with the power source.

* * * * *